United States Patent [19]

Nuding

[11] 4,354,270

[45] Oct. 12, 1982

[54] SELF-MONITORING SYSTEM FOR SUPERVISING CONGRUENCE BETWEEN CONTROL SIGNALS

[75] Inventor: Alfred Nuding, Aalen, Fed. Rep. of Germany

[73] Assignee: Herion-Werke KG, Fellbach, Fed. Rep. of Germany

[21] Appl. No.: 104,894

[22] Filed: Dec. 18, 1979

[30] Foreign Application Priority Data

Dec. 19, 1978 [DE] Fed. Rep. of Germany ....... 2854779

[51] Int. Cl.[3] ............................................ G06F 11/16

[52] U.S. Cl. ..................................................... 371/68

[58] Field of Search .......................................... 371/68

[56] References Cited

U.S. PATENT DOCUMENTS

| | | | |
|---|---|---|---|
| 3,781,796 | 12/1973 | Smith | 371/68 |
| 4,096,990 | 6/1978 | Strelow | 371/68 X |
| 4,222,515 | 9/1980 | Strelow | 371/68 |
| 4,225,961 | 9/1980 | Raggenbass | 371/68 X |

*Primary Examiner*—David H. Malzahn

*Attorney, Agent, or Firm*—Michael J. Striker

[57] ABSTRACT

A system is disclosed which detects congruence and non-congruence between a plurality of control signals. In the event that non-congruence is detected, and such non-congruence lasts longer than a predetermined period of time, which period is a function of the response time of the mechanical elements whose functions are to be monitored, the system indicates the non-congruence and allows the machine to be shut down. The system is so designed that it monitors its own functions so as not to allow a machine to which it is connected to operate without a properly functioning supervisory system.

8 Claims, 4 Drawing Figures

SELF-MONITORING SYSTEM FOR SUPERVISING CONGRUENCE BETWEEN CONTROL SIGNALS

BACKGROUND OF THE INVENTION

This invention pertains to systems that monitor control signals. In complicated machinery, it is common practice to have a collection of switches which open and close depending upon the state of the machine. For example, in an eccentric press, the use of a dual-plunger electrically operated solenoid valve is established. Such a valve is so arranged that when the valve is operating properly, the plungers will move in and out together. It is possible to provide two switches, with one switch being associated with each plunger and being actuated thereby to turn on and off depending upon the plunger's position. Such a valve is conventionally energized by a main switch, the status of which can also be ascertained by an additional third switch. Thus, it is possible to ascertain the actual status of the valve and the main switch by use of control signals which are turned on and off by auxiliary switches which are associated with the valve and the main switch.

In the event that it is desired to supervise such control signals, it is of great importance that the system which performs the supervision inform an operator when the system itself malfunctions. Otherwise, it is possible that the system through its own malfunction would cease to serve as a supervisor of the actual status of the main switch and the control valve and would therefore permit the machine to operate even though a malfunction had occurred.

SUMMARY OF THE INVENTION

It is thus the object of this invention to provide a system which will supervise the congruence or non-congruence of a plurality of control signals, such as can be generated by the auxiliary switches mentioned above. As used herein, the term "congruence" refers to control signals which indicate consistent and desired states of the functions being monitored, while "non-congruence" indicates an inconsistent and undesired state of such functions. For example, if one control signal indicated that the main switch on an eccentric press was closed, and the other two switches indicated that the solenoid valve was de-energized, the control signals would be non-congruent. On the other hand, if one control signal indicated that the main switch was open, and the other two signals indicated that the solenoid valve was de-energized, the control signals would be congruent. Likewise, if two control signals indicated that both plungers of the solenoid valve were simultaneously extended, they would be congruent, while if those two control signals indicated that one plunger was withdrawn while the other plunger was extended, those control signals would be non-congruent.

Moreover, it is a further object of this invention to provide such a system which will monitor its own function and will indicate when a malfunction occurs in its own operation, in order to alert an operator that the system has malfunctioned and thereby prevent the functions being supervised, i.e., the actual mechanical statuses of the solenoid valve and main switch, from continuing to operate without the existence of a properly-functioning supervisory system.

In order to accomplish these objectives, and others which will become apparent hereinafter, this invention has a redundant structure. In this invention, a plurality of congruence networks are utilized, which process the control signals and which indicate whether or not the signals are congruent with each other. Each network is identical to the others, and each network independently processes the control signals to ascertain the states of congruence and/or non-congruence. Because all the congruence networks are identical, they will all operate in exactly the same fashion if all of them are operating properly. In the event that one is not operating properly, inconsistencies in operation will result and these inconsistencies can be utilized to inform an operator of the existence of a malfunction.

In this invention, a malfunction monitor is connected to all the congruence networks. Each congruence network feeds a plurality of signals to the malfunction monitor which signals indicate the status of various portions of the congruence networks. As a result of the unique design of the malfunction monitor it is possible to pinpoint the exact location of any malfunctions which may arise within the congruence networks, and to thereby facilitate replacement of parts and repair.

In practice, it is of course possible that the malfunction monitor can, upon the detection of a malfunction, cause the machine whose functions are being monitored to stop, and thereby inform an operator that the malfunction has occurred and that the supervisory system is not operating properly. However, this is not essential to the invention herein. It is preferably possible that the supervisory system not turn the machine off, but rather merely inform an operator that a malfunction has occurred in the supervisory system, so that the operator can visually supervise the functioning of the machine and, in the absence of any malfunction in the functions being monitored, keep the machine operating until a convenient time arises for shutdown.

This invention incorporates appropriate circuitry to enable an operator to manually deliver a reset pulse to the system to clear the system after a malfunction has occurred. However, this circuitry is so designed that in the event that the manually operated switch which generates the reset pulse remains closed through malfunction, the malfunction will be detected and the system will not continue to operate.

Because it is known that short time delays can result between the time that, for example, the solenoid valve is energized and the time that the plungers move, this invention incorporates appropriate circuitry to enable momentary non-congruence between the control signals to be unrecognized within the system until such time as the non-congruence has been corrected. In this fashion, a momentary non-congruence between the control signals which is caused by normal response times of the mechanical elements involved will not be interpreted as a malfunction of the machine. In this invention, as will be seen hereinafter, this circuitry utilizes an automatic clear pulse generator which generates a reset pulse after any momentary non-congruance between control signals has been corrected.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF PREFERRED EMBODIMENTS

Figure 1A:
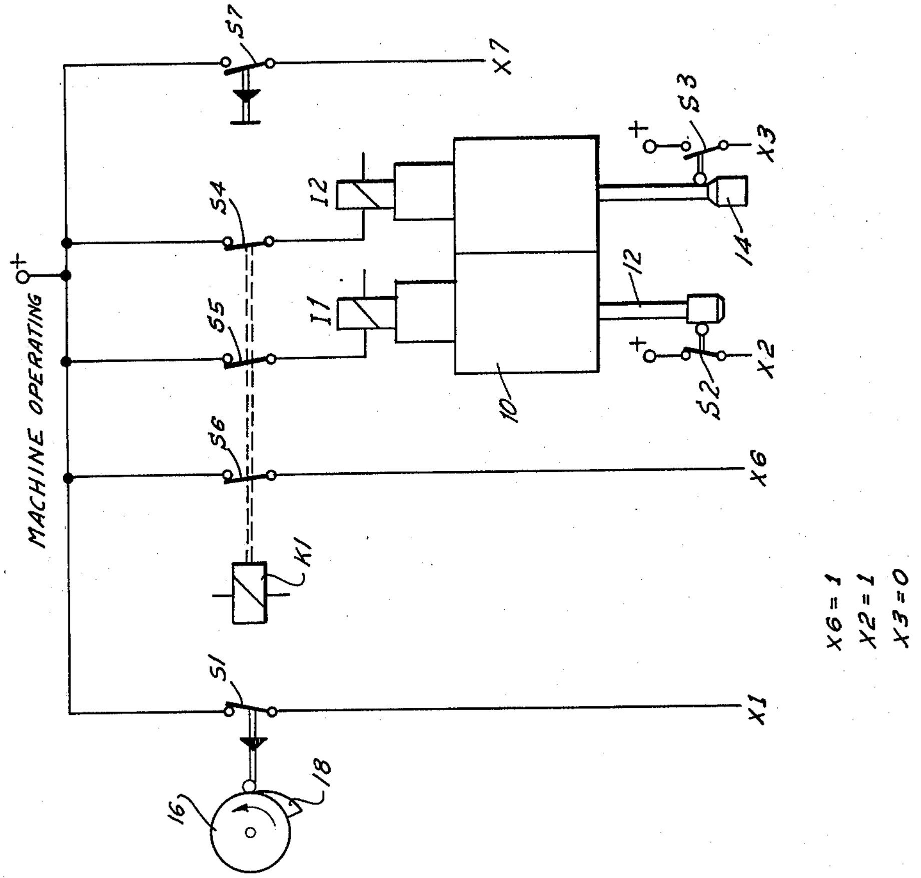
FIG. 1*a* is a schematic diagram of parts in an eccentric press whose functions are to be monitored by means of control signals which are supervised by the invention herein, the eccentric press being shown to be operating.
Figure 1B:
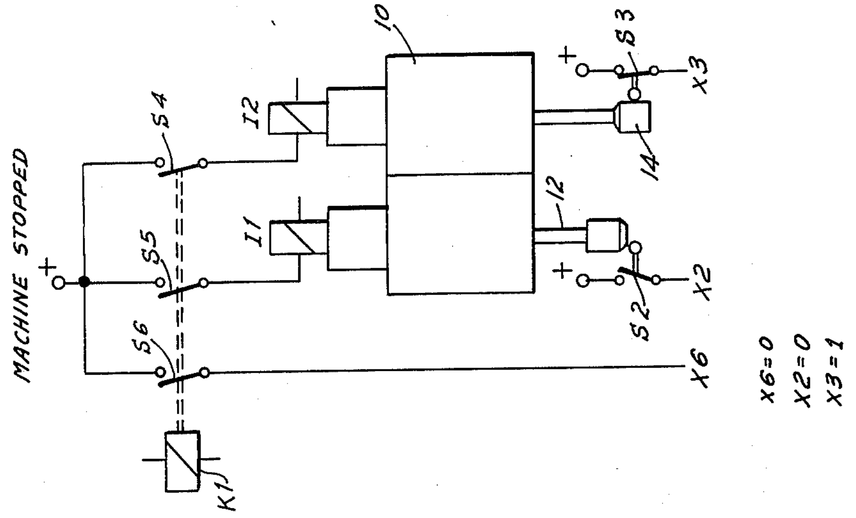
FIG. 1*b* is a diagram similar to FIG. 1*a*, in which the eccentric press is stopped.

Referring first to FIGS. 1*a* and 1*b*, it can be seen that a main switch K1 is a switch which turns an eccentric press on and off. Switch K1 is mechanically connected to three switches: S6, S5, and S4. The latter two switches, namely S5 and S4, respectively energize input windings I1 and I2 of an electrically operated electro-pneumatic solenoid safety valve 10. Solenoid valve 10 has two elongated plungers 12 and 14, which can be extended from and withdrawn within the body of the valve 10. The valve 10 is so designed that plungers 12 and 14 will, when the valve is operating properly, be withdrawn from and will extend from the solenoid valve 10 together. As shown in FIGS. 1*a* and 1*b*, the solenoid valve 10 is so designed that when it is energized, both plungers 12 and 14 will be extended from its body, while plungers 12 and 14 will be withdrawn into its body when the solenoid valve 10 is de-energized. Thus, it may be seen that when the switch K1 is properly operating switches S4, S5 and S6, that when switch K1 is closed and valve 10 is energized, plungers 12 and 14 will be extended out of the body of solenoid valve 10, while when switch K1 is open, the plungers 12 and 14 will be withdrawn into the body. As was mentioned above, switch S6 is mechanically connected to switch K1, and opens and closes therewith. Thus, when switch K1 is closed, switch S6 will also be closed and will thus transmit current and generate a control signal which is connected to power, i.e., is equal to 1 digit. In a similar fashion, switch S2 is associated with plunger 12 and switch S3 is associated with plunger 14. It should be noted that the sensors of operation of switches S2 and S3 are opposed to each other. It can be seen in the Figures that when plunger 12 is extended from the body of solenoid valve 10, switch S2 will be closed, while when plunger 14 is extended out of the body of solenoid valve 10 switch S3 will be open. Withdrawal of plunger 12 into the body of solenoid valve 10 will open switch S2 while withdrawal of plunger 14 into the body of solenoid valve 10 will close switch S3. As in the case of switch S6 switches S2 and S3 will be connected to power when closed, and will thus generate control signals equal to one when closed and equal to zero when open.

It may now be seen that the opening and closing of switch K1 will, when the solenoid valve 10 is operating properly, generate three control signals: X6, which is the control signal associated with switch S6; X2, which is the control signal generated by switch S2; and X3, which is the control signal generated by switch S3. As is shown in these Figures, when the machine is operating and everything is operating normally, X6 will be equal to one digit, X2 will be equal to one, and X3 will be equal to zero. Conversely, when switch K1 is open, and the machine is stopped, X6 will be equal to zero, X2 will be equal to zero, and X3 will be equal to one. As will be seen hereinafter, these three controls signals will be supervised for congruence with each other. Prior to discussing the actual process by which such congruence is supervised, it is appropriate to note now in passing that switches S1 and S7 may also be connected to power. It is only necessary at this point to note that switch S1, which has the function of testing the relays hereinafter described, is normally closed and thus normally generates a signal X1 which is equal to one. In addition, push button S7 is a manually-operable push-button which allows an operator to generate a reset pulse. Normally, switch S7, will be open, and thus the signal generated by switch S7 namely control signal S7, will be equal to zero.

Figure 2:
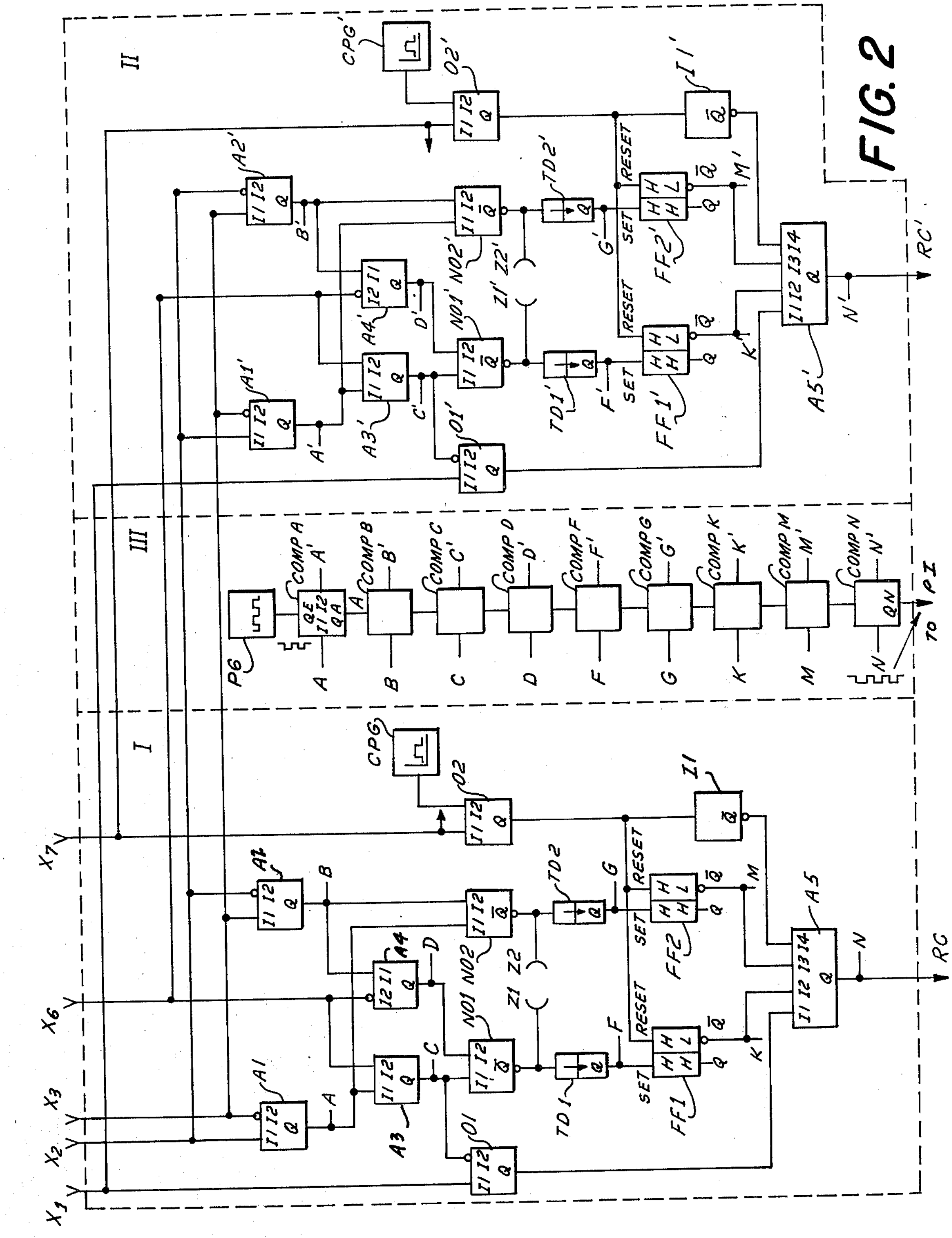
FIG. 2 is a diagram showing the electronic circuitry which supervises the congruence of the control signals and monitors the proper functioning of the invention.

In the following discussion of the workings of the circuitry shown in FIG. 2, it must be kept in mind that control signal X1 will be considered equal to one and signal X7 will be equal to zero, as is indeed normally the case. As can be seen from FIG. 2, the logic circuitry shown has three separate portions. Of these, two (namely the right-hand and left-hand portions shown in FIG. 2) are congruence networks. Both congruence networks are structurally identical, with corresponding elements bearing the same reference numeral. However, the elements in the first congruence network, which is the network shown on the left-hand portion of FIG. 2, are all indicated by a numeral alone, while corresponding elements in the second congruence network, namely the network shown on the right-hand portion of FIG. 2, are all denoted by reference numerals which bear primes. Thus, for example, flipflop FF1 indicates a flipflop located in the first congruence network, while FF1' indicates the corresponding flipflop located in the second congruence network. The description given below applies to the operation of both congruence networks, since the congruence networks are identical. It will also be noted that the inputs to the two congruence networks are in parallel with each other, so that at all times the two congruence networks will be simultaneously supervising the congruence and non-congruence of the control signal in an indentical fashion.

Control signals X2 and X3 are routed to AND-gates A1 and A2. It will be seen from FIG. 2 that each of these AND-gates have two inputs, one of which is inverted, and a single output. In both gates, input I2 is inverted. Gates A1 and A2 are in parallel with each other, but the direction of parallelism is reversed. Hence, control signal X2 is routed to input I1 of gate A1, while it is routed to inverted input I2 of gate A2. In a similar fashion, control signal X3 is routed to inverted input I2 of gate A1, and is also routed to input I1 of gate A2. The case where the eccentric press is operating will first be considered. As was noted above, in this case control signal X2 will be equal to one, and control signal X3 will be equal to zero. It may thus be seen that gate A1 will develop an output signal point A which is equal to one, since control signal X3, although zero, is supplied to an inverted input I2. Conversely, gate A2 will have an output signal at point B which is equal to zero, since both of its inputs are not equal to one.

It will be remembered that control signal X6 is equal to one. This signal is routed to input I2 of AND-gate A3, and the output of gate A1 is connected to input I1 of gate A3. Since the output signal at point A of gate A1 is equal to one and control signal X6 is equal to one, it can be seen that the output signal of gate A3 at point C will also be equal to one, since both inputs of gate A3 are equal to one. AND-gate A4 also haas two inputs I1 and I2, but input I2 of gate A4 is inverted. Control signal X6 is routed to input I2 of gate A4 and the output of gate A2 is connected to input I1 of gate A4. It will now appear that the inputs to gate A4 are such that the output signal of gate A4, at point D, will be equal to zero. In sum, it can be seen that when the eccentric press is operating, control signal X2 will equal one, control signal X3 will equal zero, control signal X6 will equal one, the signal at point A will equal one, the signal at point B will equal zero, the signal at point C will equal one, and the signal at point D will equal zero.

The output of gate A3 is connected to input I1 of NOR-gate NO1. The output of gate A4 is connected to input I2 of gate NO1. It may now be understood that the output signal of gate NO1 will be equal to zero, since gate NO1 can only have an output equal to one if neither of its inputs I1 and I2 are equal to one, and input I1 is equal to one as was described above. Thus, at point Z1, the output signal of gate NO1 is equal to zero. NOR-gate NO2 has input I1 connected to the output of gate A1. Input I2 of gate NO2 is connected to the output of gate A2. Thus, gate NO2 will also have an output signal equal to zero, at point Z2. Thus, while the eccentric press is running, and assuming that everything is operating properly, points Z1 and Z2 will have signals equal to zero. The output of gate NO1 is connected to the set terminal of flip-flop FF1 via time delay TD1. Similarly, the output of gate NO2 is connected to the set terminal of flipflop FF2 via time delay TD2. Time delays TD1 and TD2 are identical. The function of time delays TD1 and TD2 is not apparent at this point in this description, and will be described hereinafter. It is only necessary at this point to assume that steady-state exists in this case, and if that assumption is made, it will appear that the output of TD1 at point F and the output of TD2 at point G will both equal zero.

It can be seen in FIG. 2 that flipflops FF1 and FF2 are so connected that their inverted outputs are utilized for storing information. Thus, when flipflops FF1 and FF2 are in their reset state, their inverted outputs will have output signals equal to one. Conversely, when flipflops FF1 and FF2 are in their set states, their inverted outputs will have signals equal to zero. At this point, a further assumption is made that the flipflops FF1 and FF2 are, prior to receipt at their set inputs of the zero signals appearing at points F and G, in their reset states. Since flipflops FF1 and FF2 are in their reset states, their inverted outputs at K and M, respectively, will have signals equal to one. Thus, their receipt of signals equal to zero at their set inputs will have no effect on their states, and they will remain in their reset state with their output signals equal to one. The output of flipflop FF1 is routed to input terminal I2 of AND-gate A5, via point K. In a similar fashion, the output of flipflop FF2 is connected to input I3 of gate A5, via point M. Since both outputs of the flipflops have signals equal to one, both inputs I2 and I3 of gate A5 will receive signals equal to one.

Recalling the original assumption that switch S1 is closed and that control signal X1 is thus equal to one, it can be seen that an output signal of OR-gate O1 will be equal to one, since control signal X1 is routed to input I1 of gate O1. Since the output signal of gate O1 is thus equal to one, and since this output is connected to input 11 of gate A5, a signal equal to one will also appear at input I1 of gate A5. Recalling the additional assumption that switch S7 is open, control signal X7 will be equal to zero. This control signal is routed to input I1 of OR-gate O2. Assuming that input I2 of gate O2 is zero, which assumption is justified and will be explained hereinafter, the output of gate O2 will also be zero. The output of gate O2 is connected both to the reset terminals of flipflops FF1 and FF2 and, in addition, to the input of inverter I1. Because the output signal of gate O2 is equal to zero, it has no effect on the states of flipflops FF1 and FF2. However, this output signal of gate O2 does result in the generation of an output signal of inverter I1 equal to one. The output of inverter I1 is routed to input I4 of gate A5. Thus, with all the assumptions made above, all the inputs of gates A5 are equal to one, and gate A5 thus generates an output signal at point N equal to one.

To re-summarize the operation of the congruance networks as described so far, it can be seen that when the flipflops are assumed to be in their reset states, and no reset pulses are generated by switch S7 or clear pulse generator CPG, (which has not at this time been discussed), and when the eccentric press is operating normally, the flipflops FF1 and FF2 will remain in their reset states and generate output at, respectively, points K and M, both equal to one, which allow gate A5 to produce an output signal at point N equal to one. The function of the output of gate A5 will be described hereinafter, but it is only important at this point in this description to understand what conditions turn gate A5 on and what conditions turn gate A5 off, so as to generate an output signal equal to zero at point N.

Having established that A5 will produce an output signal at point N equal to one under the above assumptions, it is now necessary to consider the operation of gate A5 when the eccentric press is stopped. Once again, it will be assumed that switch S1 is closed, so that control signal X1 will be equal to one, it will be further assumed that switch S7 is opened so that control signal X7 is equal to zero, it will be still further assumed that the flipflops FF1 and FF2 are in their reset states, and it will be finally assumed that the eccentric press is stopped. This last assumption has, as was mentioned above, the consequence that control signal X2 will be equal to zero, control signal X3 will be equal to one, and control signal X6 will be equal to zero.

Working with these assumptions, it may now be verified by those skilled in the art that gate A1 will have an output signal at point A which is equal to zero, since the signals appearing at its inputs I1 and I2 are not, respectively, one and zero. Similarly, it can be seen that the output signal of gate A2 at point B will be equal to one, since I1 will be one, and input I2 will be zero. It will be further apparent that gate A3 will have an output signal at C which is equal to zero, since input I1 of gate A3 is zero. However, a signal equal to zero will appear at input I2 of gate A4, and a signal of one will appear at input I1 of gate A4. Thus, a signal equal to one will appear at point D. Thus, since input I2 of gate NO1 has a signal of one, gate NO1 will produce an output signal of zero at point Z1. Similarly, since input I2 of gate NO2 will have a signal of one, gate NO2 will also produce an output signal of zero at point Z2. To recapitulate, although the outputs of gates A1, A2, A3, and A4 are switched depending upon whether or not the eccentric press is operating, gates NO1 and NO2 will still produce outputs equal to zero. Thus, using the assumptions which were previously made, it can be immediately seen that, as before, all the inputs to gate A5 will have signals equal to one and therefore gate A5 will produce an output signal at point N which is still equal to one.

Thus, when all the control signals are congruant as is described above, gate A5 will produce an output signal equal to one at point N, regardless of whether the eccentric press is operating or whether the press is stopped.

It now is appropriate to discuss the operation of switch S1 regarding the effect that the control signal X1 has on gate A5. When the eccentric press is stopped, it will be remembered that, at point A and C, signals equal to zero are present. It can be seen in FIG. 2, that the output of gate A3 is additionally routed to inverted input I2 of gate O1, in addition to being routed to input I1 of gate NO1. Since when the machine is stopped a signal equal to zero is routed to an inverted input of gate O1, which is an OR-gate, an output signal equal to one will appear at the output gate O1 regardless of whether or not switch S1 is opened or closed. Thus, when the machine is stopped, the actual status of switch S1 is irrelevant vis-a-vis gate A5, since gate O1 will always have an output signal equal to one and input I1 of gate A5 will thus always be equal to one. However, when the eccentric press is operating, an output signal equal to one will appear at C, which signal, by itself, is ineffective to produce an output signal equal to one at the output of gate O1. It may now be seen that the output signal of gate A5 appearing at point N depends upon whether or not control signal X1 is equal to one or is equal to zero. If switch S1 is closed, and control signal X1 is thus equal to one, gate O1 will produce an output equal to one and input I1 will, as before, be equal to one. Thus, when the eccentric press is operating, and when switch S1 is closed, gate A5 will produce an output signal equal to one at point N. However, when switch S1 is open while the eccentric press is operating, an output signal equal to zero will appear at the output of gate O1, thus causing a zero to appear at input I1 of gate A5, which in turn will cause the output signal of gate A5 appearing at point N to be zero. Thus, it can be seen that when the machine is operating, the output signal appearing at point N of gate A5 will be equal to one when switch S1 is closed and will be equal to zero when switch S1 is opened. As will be explained hereinafter, switch S1 is indeed opened and closed during the operation of the eccentric press. Thus, if everything is operating normally under the assumptions described above, the output signal of gate A5 appearing at point N will appear as a one, punctuated regularly by zeros which result from the relatively infrequent openings of switch S1.

The foregoing description has been conducted assuming that the control signals X2, X3 and X6 were all congruent with each other. This assumption of congruence resulted from the even more basic assumption that the solenoid valve 10 was operated properly and was properly energized or de-energized by main switch K1. It now becomes necessary to examine additional cases which illustrate the consequences of non-congruence between these three control signals. As before, it will be assumed that switch S1 is closed, causing control signal X1 to be equal to one, and it will be further assumed that switch S7 is open, causing control signal X7 to be equal to zero. Finally, it will be assumed that flipflops FF1 and FF2 are in their reset states. In the first case considered herein, it will be assumed that the plungers 12 and 14 of solenoid valve 10 are malfunctioning. In particular, it will be assumed that even when the eccentric press is operating, that plunger 12 has remained in its withdrawn position into the body of solenoid valve 10. In this situation, it follows that although control signal X6 still equals one, and control signal X3 still equals zero, control signal X2 will not equal one as before but will equal zero, since plunger 12 is not operating and is left in its withdrawn position in which switch S2 is opened and control signal X2 is thus equal to zero.

As has been described above, gates A1 and A2 are in parallel with each other with their inputs reversed and connected to control signals X2 and X3. In this current assumption, both control signals X2 and X3 are equal to zero. Thus both gates A1 and A2 will produce output signals equal to zero at points A and B, since each gate A1 and A2 requires one input signal equal to one in order to generate an output signal equal to one. Since the output signals at point A and B are equal to zero, both inputs I1 and I2 of gate NO2 are equal to zero.

Since neither of the inputs I1 and I2 of gate NO2 are equal to one, gate NO2 produces an output signal equal to one at point Z2. After a suitable time delay, this signal (which is equal to one) will eventually be transmitted to the set terminal of flipflop FF2. This will cause the inverted output of flipflop FF2 at point M to have a signal equal to zero. Thus, the non-congruance between control signals X2 and X3, which are both equal to zero, will result in an output signal equal to one at the output of gate NO2 which output signal will eventually cause input I3 of gate A5 to have a signal equal to zero, which will in turn cause the output signal of gate A5 at point N to be equal to zero. Moreover, the output of gate A3 at point C will have a signal equal to zero, since input I1 of gate A3 has a signal equal to zero. Similarly, gate A4 will have an output signal at D which is equal to zero, since input I2 of gate A4 will have a signal equal to one. Thus, since the inputs I1 and I2 of gate NO1 are both zero, gate NO1 will also produce an output signal equal to one at point Z1. In exactly the same fashion, this signal (which is equal to one) will eventually be reflected at the set terminal of flipflop FF1 and cause its inverted output at point K to have an output signal equal to zero, which output signal is reflected at input I2 of gate A5. Thus, in this situation, both inputs I2 and I3 of gate A5 will have signals equal to zero, and, of course, the output signal of gate A5 appearing at point N will be zero. In sum, the non-congruence between control signals X2 and X3 will cause both gates NO1 and NO2 to produce output signals equal to one, which will place both flipflops FF1 and FF2 in their set states, which placement will in turn cause the output signal of gate A5 at point M to be equal to zero.

It would be unduly repetitious to retrace the above analysis for the different cases in which one of the plungers 12 and 14 malfunctioned as a result of a malfunction of solenoid valve 10. It will appear to those skilled in the art that in the event that control signals X2 and X3 are not of opposite senses, both gates NO1 and NO2 will have output signals equal to one and both flipflops FF1 and FF2 will be placed in their set states to set inputs I2 and I3 of gate A5 equal to zero and thereby cause the output of gate A5 at point N to have a signal equal to zero. Hence, it may be seen that such a non-congruence between control signals X2 and X3 will result in an output signal equal to zero at point N, regardless of the control signal X6.

However, it is possible that although control signals X2 and X3 are congruant with each other, that they are not congruent with control signal X6. This might, for example, result from improper operation of switch S6 or switch K1. To illustrate the consequences of non-congruent between control signal X6 and the two control signals X2 and X3 it may be assumed that although switch K1 has been closed, causing switch S6 to be closed, as a result of a malfunction of solenoid valve 10, control signal S6 is equal to one while control signal X2 is equal to zero and control signal X3 likewise is equal to one.

It has already been established that when control signal X2 is equal to zero and control signal X3 is equal to one, that the output signal appearing at point A of gate A1 will be equal to zero and the output of gate A2 at point B will be equal to one. Since the output signal at point A is equal to zero, gate A3 has an output signal equal to zero at point C. Moreover, input I2 of gate A4 will have a signal equal to one, while input I1 of gate A4 will have an input signal equal to one. Since the inputs I1 and I2 of gate A4 are not, respectively, one and zero at the same time, gate A4 will produce an output signal equal to zero at point D. Thus, in this case, gate NO2 will produce an output signal equal to zero at point Z2, since input I2 of gate NO2 will have a signal equal to one. However, since both inputs to gate NO1 will have signals equal to zero, an output signal equal to one will appear at point Z1. Thus, in this case, where control signals X2 and X3 are congruent with each other but not congruant with control signal X6, gate NO1 will have an output signal that differs from the output signal of gate NO2. Since, as was discussed above, an output signal equal to one at point Z1 will eventually result in flipflop FF1 being placed in its set state, input I2 of gate A5 will have a signal equal to zero, and the output of gate A5 appearing at N will also have a signal equal to zero. As before, it would be unduly repetitious to retrace this analysis for the additional case in which X2 and X3 are congruent with each other while not being congruent with control signal X6. It suffices to state that whenever control signals X2 and X3 are congruent with each other but are not congruent with control signal X6, only flipflop FF1 will be placed in its set state. On the other hand, whenever control signals X2 and X3 are non-congruent with each other, both flipflops FF1 and FF2 will be placed in their set states, resulting in an output signal equal to zero appearing at point N.

It is premature at this point to describe what effect an output signal at point N equal to zero has on the subsequent operation of the eccentric press. It is only important at this point to note that there is indeed a connection between this output signal and the subsequent operation of the eccentric press. The rest of the circuitry hereinafter described is so designed that the signal appearing at point N must be zero for longer than a predetermined time in order to turn the press off. It is at this point that the functions of time delays TD1 and TD2, as they relate to the function of the generation of a reset pulse, can be described.

Because the connections between switch K1 and switches S6, S5 and S4 are mechanical, and because solenoid valve 10 is a pneumatic electro-mechanical element, there will always be some period of lag time during which momentary non-congruence between the various control signals can be expected. For example, although switch K1 may be thrown, causing switches S6, S5, and S4 to be thrown also, it will take some period of time for solenoid valve S10 to react to the changes in current passing through its windings I1 and I2 and thus there will be a momentary non-congruence between control signal X6 and the two control signals S2 and S3. Moreover, a lag time even between control signals X2 and X3 can be expected, since solenoid valve 10 is not perfect and the plungers 12 and 14 do not operate simultaneously. Thus every time switch K1 is thrown, momentary non-congruence between these three control signals can be expected.

In the event that there were no time delays such as TD1 and TD2 interposed between gates NO1 and NO2 and their corresponding flipflops FF1 and FF2, these momentary non-congruences would immediately cause either one or both of the flipflops FF1 and FF2 to assume a set state. Even if such momentary non-congruences were to be quickly eliminated after this expected lag time, the subsequent zero signals appearing at the set terminals of the flipflops would not cause the flipflops to regain output signals equal to one at their inverted outputs. It is known to those skilled in the art that once when a set line on a flipflop is pulsed, the flipflop will remain in its set state until a reset pulse is applied to its reset line. Thus, after such momentary non-congruence, one or both of the flipflops FF1 and FF2 would not only be placed in a set state, but in addition the flipflops FF1 and FF2 would have to be reset manually by an operator. (It may be noted that such resetting is possible according to the circuit provided herein. If pushbutton S7 were closed after either or both of the flipflops FF1 and FF2 had been set, gate O2 would have a momentary input signal at input I1 equal to one. This would in turn cause the output of gate O2 to have a signal equal to one, and this output, as can be seen in FIG. 2, is connected to the reset terminals of flipflops FF1 and FF2. Thus, a momentary depression of pushbutton S7 would indeed reset both flipflops. At the same time, the same pulse that resets flipflops FF1 and FF2 is also routed to the input of inverter I1, which would momentarily cause an output signal equal to zero to appear at input I4 of gate A5. Thus, it is perfectly possible for an operator to manually reset flipflops FF1 and FF2, and such resetting will result in an output signal equal to zero appearing at N for the period during which pushbutton S7 is closed.) Since it is known that momentary non-congruence of this sort will result every time switch K1 is thrown, it is desirable to provide circuitry which will not necessitate the operation of pushbutton S7 every time the switch K1 is thrown.

In order to obviate this necessity, clear pulse generator CPG is provided. Clear pulse generator CPG is associated with switch K1, and, shortly after switch K1 is thrown, always generates a one-shot clearing pulse. As can be seen in FIG. 2, this pulse is routed to input I2 of gate O2. As was mentioned above, such a pulse will serve to reset the two flipflops FF1 and FF2 while momentarily causing the output signal appearing at point N to be equal to zero during the period that the pulse exists. The operation of clearing pulse generator CPG is coordinated with the time delays of delays TD1 and TD2 so as to cause flipflops FF1 and FF2 to be reset after they sense a momentary non-congruence.

In order to understand the manner in which this is accomplished, it is appropriate to consider the time sequence involved. Assume that switch K1 is thrown. Immediately, certain non-congruence between the various control signals X2, X3, and X6 will exist. Thus, immediately, the output signals appearing at either or both of gates NO1 and NO2 will be equal to one. However, during such period of momentary non-congruence, the time delays TD1 and TD2 prevent an immediate setting of either or both of flipflops FF1 and FF2. In other words, delays TD1 and TD2 mask the effect of the momentary non-congruence.

Shortly after switch K1 is thrown, clear pulse generator CPG generates a short clearing pulse. This pulse appears at input I2 of gate O2. If the operation of clear pulse generator CPG is properly timed with respect to the throwing of switch K1 and the time delays caused by delays TD1 and TD2, the resultant reset pulse generated at the output of gate O2 will arrive at the reset terminals of flipflops FF1 and FF2 immediately after the pulses of the outputs of gates NO1 and NO2 arrive at the set terminals of flipflops FF1 and FF2. Thus, although there is indeed a momentary flipping and flopping of flipflops FF1 and FF2 which causes a momentary output signal equal to zero to appear at point N, this output signal appearing at point N will be zero for a time at most equal to the time difference between the times that the time flipflops FF1 and FF2 receive the two set and reset pulses plus the time during which the reset pulse is on. In other words, switch K1, clear pulse generator CPG and the two time delays TD1 and TD2 interact in such a fashion that the momentary pulses appearing at the outputs of gates NO1 and NO2 are, after their appearance at the set terminals of flipflops FF1 and FF2, immediately followed by a reset pulse appearing at the reset terminals of flipflops FF1 and FF2. Thus, flipflops FF1 and FF2 only generate momentary zero signals at their outputs and only momentarily cause the output of gate A5 at point N to have an output signal equal to zero. Hence, momentary non-congruence between the various control signals merely pulses the flipflops FF1 and FF2 very quickly, causing them to go from a reset state to a set state and back again within a very short period of time.

Points Z1 and Z2 are actually terminals which are accessible from the outside of each non-congruence network. It will be obvious to those skilled in the art that the duration of the pulses appearing at Z1 and Z2 is equal to the length of time that a non-congruence between the control signals X2, X3 and X6 exists. Points Z1 and Z2 are provided in order to allow the lag time during which such non-congruence exists to be measured by a suitable device (not shown). However, in the event that the non-congruence between the various control signals last longer than predetermined time, either gate NO1 or both gates NO1 and NO2 will have output pulses of sufficiently long duration that a pulse appearing at the reset terminals of the flipflops FF1 and FF2 will not follow such output pulse or pulses. Hence, a prolonged period of non-congruence will cause either flipflop FF1 alone, or flipflops FF1 and FF2 together, to shut gate A5 down, so that its output signal appearing at N will remain zero.

Thus, in summary, each congruence network independently verifies the congruence and non-congruence between the various control signals X2, X3, and X6. In the event that all the signals are congruent, the flipflops FF1 and FF2 will remain in their reset states and gate A5 will turn on and off, pulsing the output signal appearing at N, depending upon the opening and closing of switch S1. In the event that any momentary non-congruence results from the throwing of switch K1, only a short interruption of the output signal appearing at N will occur. However, in the event that the control signals X2, X3, and X6 remain (or become, during operation) non-congruent for longer than a predetermined period of time, the non-congruence will be reflected in either or both of the flipflops FF1 and FF2 depending upon the nature of the non-congruence and the output signal at N will drop to zero and remain there.

Thus, it can be seen that the congruence networks serve to supervise the states of congruence and non-congruence between the three control signals X2, X3, and X6. However, such supervision is only one function of the circuitry here described. In addition, the operability of the congruence networks must be continuously monitored, in order to insure that they function properly and that, as a result of malfunction, they do not cease to properly supervise such congruence and non-congruence between the various control signals.

This self-monitoring function is performed by the deliberate redundancy of the two congruence networks. As was explained above, both networks are identical in structure and are designed to function in exactly the same fashion. Thus, it can be seen that at corresponding points between the two congruence networks, the output signals should always be identical. For example, in the event that the signal appearing at point A is not exactly equal to the signal appearing at point A', it can be seen that a malfunction exists somewhere in either gate A1 or gate A1'. It has been exhaustively explained that the congruence supervision over the control signals X2, X3 and X6 is provided by gates A1, A2, A3, A4, NO1, NO2, A5, and flipflops FF1 and FF2, in the first congruence network. Of course, gates A1', A2', A3', A4', NO1', NO2', A5', and flipflops FF1' and FF2' perform the same supervision functions in the second congruence network. Since these are the elements which perform the actual supervision function, each one of them has its output monitored in order to ascertain whether or not it is operating in the same fashion as is its corresponding element in the other congruence network. The reason why so many outputs are individually monitored is to allow the location of any malfunction in any one of these elements to be immediately ascertained as is explained below. It should be noted that the self-monitoring function to be described only works because it is extremely unlikely that a given pair of corresponding elements will malfunction in exactly the same fashion at exactly the same time. It is theoretically possible that, for example, gates NO1, and NO1' begin to malfunction at exactly the same time so that their outputs as measured at points F and F' are identical, yet erroneous. However, this eventuality is extremely unlikely, and it is safe to assume that any malfunction in one of the elements in one of the congruence networks will not be immediately reflected in the corresponding element in the other network at precisely the same time. Thus, at least a short period during which the two relevant outputs differ from each other can ordinarily be expected, and the system herein is thus extremely reliable.

The self-monitoring function is performed by pulse generator PG, in cooperation with nine comparators COMPA-COMPN. All these comparators are connected in series with the pulse generator PG and with each other. Each comparator compares an output from one portion of one of the congruence networks with the corresponding output from the corresponding portion of the other congruence network. In the event that the two outputs are identical, the comparator allows the train of pulses generated by the pulse generator to proceed onward to the next comparator in the chain. Hence, in order for the train of pulses generated by the pulse generator to emerge from the output of comparator COMPN, all the corresponding outputs between the corresponding portions of the two congruence networks must be identical. In the event that any two corresponding outputs are not identical, the entire train of pulses will be interrupted and there will be no output of pulses from comparator COMPN. As will be later explained, this interruption of the train of pulses will serve to indicate a malfunction.

Each of the comparators is associated with a corresponding light-emitting diode (not shown), which turns on and off to indicate whether the comparator is conducting pulses or interrupting them. Thus, a malfunction between any two corresponding outputs can be immediately ascertained by an operator so that the relevant two elements in the two congruence networks can be checked for proper operation. This feature allows speedy location of such a malfunction and thus facilitates quick repair.

Moreover, other self-monitoring features are present. For example, if pushbutton S7, because of malfunction, remains closed even after an operator has released it, gates O2 and O2′ will retain output signals equal to one and will thus generate signals equal to zero at inputs I4 of gates A5 and A5′. Thus, a malfunctioning reset button can be detected because output signals at N and N′ will cease. Moreover, as will be seen hereinafter, the pulsing of gates A5 and A5′ as a result of the opening and closing of switch S1 serves to test the relays which are eventually operated by this circuitry.

At this point, it is known that a pulse train will emerge from the output of comparator COMPN when and only when both congruence networks are operating properly. In the event that they are not operating properly, no such pulse train will emerge. It is also known that in the event that pushbutton S7 sticks in the closed position that the output signals at N and N′ will both be equal to zero. It is further known that any prolonged non-congruence between control signals X2, X3, and X6 will result in a signal at N and N′ which remains zero. It is finally known that the output signals at N and N′ are intermittently pulsed to zero by the opening of switch S1.

Figure 3:
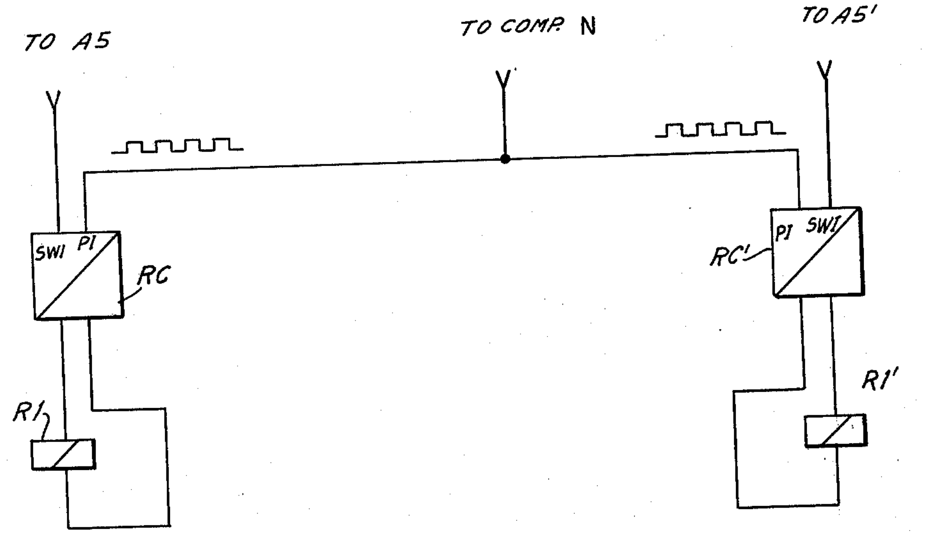
FIG. 3 is an exemplary illustration of suitable apparatus which can be connected to the invention disclosed herein in order to enable the invention to be utilized as part of a control system for an eccentric press.

It is now appropriate to discuss the utilization which is made of the outputs of gates A5 and A5′ at N and N′, and of the pulse train appearing from the output of comparator COMPN. As can be seen in FIG. 3, relay control RC is fed both by the output from gate A5 and from the pulse train from comparator COMPN. In a similar fashion, relay control RC′ is fed by the output of gate A5′ and the pulse train. Relay control RC and relay control RC′ are in parallel with each other, and are both pulsed by the pulse train. However, they are independently connected to the gates A5 and A5′. Each of the relay controls contains a pulse transformer, suitable switching logic, and a transistor amplifier, and each relay control drives a corresponding relay, which in the case of relay control RC is relay R1 and in the case of relay control RC′ is relay R1′.

Relay controls RC and RC′ are so designed that the relays R1 and R1′ are only energized when the relay controls are receiving a pulse train at pulsed input PI and, in addition, are receiving an output signal at switched input SWI. If either or both of the inputs to either relay control cease, resulting from a cessation of the pulse train generated by pulse generator PG or resulting from an output signal equal to zero at either gate A5 or gate A5′, the relay or relays involved is or are de-energized.

The relays R1 and R1′ are identical to each other. If everything is operating properly, the relays will be energized and de-energized simultaneously. Thus, in the event that everything is operating properly, both relays will be on as long as switch S1 is closed, and will be de-energized only when the switch S1 is opened. However, in the event something goes wrong, due to non-congruence between control signals, a stuck pushbutton S7, or a malfunction in either of the congruence networks, the relays will simultaneously be de-energized and will remain that way.

The contacts of the relays which are opened and closed feed back into the control system which operates the eccentric press. This control system, which is not shown, is so designed as to ignore any merely momentary de-energization of the relays. In the event that, for example, a momentary non-congruence between the control signals exists, and this momentary non-congruence is shortly corrected by proper response of solenoid valve 10 and switch K1, the momentary simultaneous de-energization of the relays will be ignored and the press will continue to operate. However, in the event that such non-congruence exists for longer than a predetermined time, the relays will be accordingly de-energized for a longer period and the control system of the eccentric press will shut the press down. As explained above, any malfunction between the two congruence networks will also have the result that the relays will be simultaneously de-energized and again the eccentric press will be shut down.

The switch S1, as can be seen in FIG. 1*a*, is opened and closed by a lobe 18 located on the rotating crankshaft 16 of an eccentric press. The lobe is so designed that switch S1 is open for only approximately 20° out of the 360° of rotation of the crankshaft 16. Thus, the switch S1 will be open for less than 6% of the rotational period of the crankshaft. Hence, it is accurate to state that switch S1 is comparatively seldom open. The purpose of switch S1 is to provide a signal which, when pulsed, causes the relays R1 and R1′ to be temporarily de-energized. At the same time, a corresponding signal can be sent to another portion of the unshown press control to enable the control to recognize that, during the period switch S1 is open, no malfunctions have been detected and no non-congruence between the control signals has been detected. However, the relays are indeed de-energized, and any failure of the relays to change the status of their contacts will immediately be reflected in the press control where such failure can be noted and utilized to stop the eccentric press.

Hence, a self-monitoring system has been disclosed for supervising the congruence and non-congruence between the control signals X2, X3 and X6. In the embodiment shown, the use of three control signals is not intended to serve as a limitation of the scope of the invention. Any number of control signals may be monitored, using appropriate congruence networks. Moreover, the use of two such networks, as has here been illustrated, is also not limited to be limiting. It is possible to utilize as many identical congruence networks in parallel with each other as are deemed necessary in order to provide sufficient reliability.

Of particular significance to the invention herein, however, is the concept of a group of signals. It will be appreciated that in this invention, control signals X2, X3 and X6 can be divided into two groups, with one group containing the control signal X6 and the other group containing the control signals X2 and X3. It will be remembered that the function of the two flipflops FF1 and FF2 in each congruance network are different. By examining the status of the outputs of these two flipflops FF1 and FF2, the nature of any non-congruence can be ascertained. If both flipflops FF1 and FF2 are set, that indicates that there is no congruence either within any group or between the two groups. On the other hand, if only flipflop FF1 is set, then it is known that the group containing control signals X2 and X3 is internally congruent, but is non-congruent with respect to the other group. Hence, in the general case, the proper positioning of a suitable number of flip-flops can enable one skilled in the art to ascertain the nature of any non-congruence which is detected by this invention. It may make a substantial difference in the operation of a machine which signals are congruent and which are not. By judiciously selecting the proper number of flipflops as related to the number of control signals to be supervised, appropriate information may be gleaned upon the detection of non-congruence anywhere in the control signal network.

Finally, it should be noted that during the period in which the relays are de-energized as a result of the opening of switch S1, the entire system is disabled from recognizing a malfunction and/or a non-congruence between the three control signals X2, X3 and X6. The reason for this is that while the outputs of gates A5 and A5' at, respectively points N and N' have signals equal to zero, a malfunction in the congruence networks or a non-congruence between the control signals will not initially be detected, since the outputs of gates A5 and A5' are already at a signal level equal to zero. However, the period during which switch S1 is open is comparatively short, thus not causing, to any significant practical extent, any inaccuracy in the self-monitoring or supervisory capabilities of this system.

It will be understood that each of the elements described above, or two or more together, may also find a useful application in other types of constructions differing from the types described above.

While the invention has been illustrated and described as embodied in a construction, it is not intended to be limited to the details shown since various modifications and structural changes may be made without departing in any way from the spirit of the present invention.

Without further analysis, the foregoing will so fully reveal the gist of the present invention that others can, by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A self-monitoring system for supervising congruence between and non-congruence between at least two control signals, comprising:

a plurality of identical logic networks connected in parallel with each other and operating independently of each other, the networks each having a plurality of inputs equal in number to the number of signals between which congruence is to be monitored, a single final output, and intermediate outputs; and a malfunction monitor connected to all outputs of all networks and comparing each output of each network to all corresponding outputs of all other networks in a manner that like intermediate outputs are only compared with each other and final outputs are compared only with each other, the malfunction monitor operating in a manner that when all like outputs are in like states, the monitor indicates such likeness, and otherwise indicates any lack of likeness and additionally indicates all outputs where such lack of likeness exists.

2. The system defined by claim 1, wherein there are at least three signals, and wherein all signals are classified into at least two groups, each such group which contains at least two signals having the property that all signals within a group may be congruent and non-congruent with each other, and wherein the groups themselves may be congruent and non-congruent with each other, each network further including:

at least one intra-group congruence subnetwork, each intra-group congruence subnetwork having a congruence state and a non-congruence state and being associated with an individual one of those groups which contains at least two signals whereby the groups which contain at least two signals and the intra-group congruence subnetworks are in one-to-one correspondence, each intra-group congruence subnetwork assuming the congruence state when all signals within its associated group are congruent and assuming the non-congruence state otherwise; and at least one inter-group congruence subnetwork having a congruence state and a non-congruence state and being associated with at least two groups of which at least one of said two groups contains at least two signals, each inter-group congruence subnetwork assuming the congruence state when all groups with which the inter-group congruence subnetwork is associated are congruent with each other and assuming the non-congruence state otherwise.

3. The system defined by claim 2, wherein each intra-group congruence subnetwork is associated with an individual intermediate output and each inter-group congruence subnetwork is associated with an intermediate output, all intermediate outputs which are associated with intra-group congruance subnetworks being other than intermediate outputs which are associated with inter-group congruence subnetworks.

4. A self-monitoring system for supervising congruence between at least two control signals varying within a predetermined time interval, particularly between two electric output signals from a safety valve of an eccentric press, comprising at least two logic networks each having identical logic members operating independently of each other, the networks each having a plurality of inputs equal in number to the number of signals between which congruence is to be monitored, a single final output, and intermediate outputs connected to outputs of consecutive logic members; a comparison circuit including a plurality of comparing members each having a first input and an output connected to the first input of a subsequent comparing member, and two additional inputs connected to corresponding intermediate outputs of respective logic members in said networks, a pulse generator connected to the first input of the first comparing member, said comparison circuit passing the pulses from said pulse generator through said comparing members when signals of said corresponding intermediate outputs in each network are identical and interrupting said pulses when said signals are not identical; a pair of control members each having an output, a first input connected to the output of the last comparing member, and a second input connected to the final output of respective networks; and a pair of relays connected, respectively, to the outputs of said control members to indicate the congruence, or non-congruence, between said control signals.

5. A system as defined in claim 4, wherein each network includes at least two flip flop members for storing a state of the logic members indicative of congruence or non-congruence of the control signals.

6. A system as defined in claim 5, wherein each network includes a first time delay means connected to said logic members for compensating minor time differences between the two control signals.

7. A system as defined in claim 6, further comprising means for generating an additional control signal which is congruent with said first mentioned control signals, at least a pair of AND-gates each having a first input connected to said additional control signal generating means and at least one additional input connected to corresponding intermediate outputs of said networks to indicate accidental non-congruence between said first mentioned control signals and said additional control signal.

8. A system as defined in claim 7, wherein each network includes a second time delay means coupled to said AND-gates to compensate minor time differences between said additional control signal and said first mentioned control signals.

* * * * *